United States Patent
Matichuk et al.

(10) Patent No.: US 12,478,258 B2
(45) Date of Patent: Nov. 25, 2025

(54) BLOOD GLUCOSE ESTIMATION USING NEAR INFRARED LIGHT EMITTING DIODES

(71) Applicant: MedWatch Technologies, Inc., Las Vegas, NV (US)

(72) Inventors: Bruce Matichuk, Alberta (CA); Mike E. Moore, Las Vegas, NV (US)

(73) Assignee: MedWatch Technologies, Inc., Las Vegas, NV (US)

( * ) Notice: Subject to any disclaimer, the term of this patent is extended or adjusted under 35 U.S.C. 154(b) by 254 days.

(21) Appl. No.: 18/179,302

(22) Filed: Mar. 6, 2023

(65) Prior Publication Data
US 2023/0284905 A1     Sep. 14, 2023

Related U.S. Application Data

(60) Provisional application No. 63/316,901, filed on Mar. 4, 2022.

(51) Int. Cl.
*A61B 5/00* (2006.01)

(52) U.S. Cl.
CPC ............ *A61B 5/0075* (2013.01); *A61B 5/683* (2013.01); *A61B 5/7278* (2013.01); *A61B 5/742* (2013.01); *A61B 2562/0233* (2013.01)

(58) Field of Classification Search
CPC ....... A61B 5/6833; A61B 5/742; A61B 5/681; A61B 5/0024; A61B 5/1477; A61B 5/6801; A61B 5/0533
See application file for complete search history.

(56) References Cited

U.S. PATENT DOCUMENTS

| | | |
|---|---|---|
| 9,420,956 B2 | 8/2016 | Gopalakrishnan et al. |
| 9,554,738 B1 | 1/2017 | Gulati et al. |
| 9,582,072 B2 | 2/2017 | Connor |
| 9,750,977 B2 | 9/2017 | Yuen et al. |
| 9,826,940 B1 | 11/2017 | Lengerich |
| 10,153,537 B2 | 12/2018 | Baringer et al. |
| 10,321,873 B2 | 6/2019 | Connor |
| 10,327,674 B2 | 6/2019 | Hong et al. |

(Continued)

FOREIGN PATENT DOCUMENTS

| | | |
|---|---|---|
| AU | 2023229292 A1 | 10/2024 |
| AU | 2023269185 A1 | 11/2024 |

(Continued)

OTHER PUBLICATIONS

International Search Report and Written Opinion, (ISRWO), Application No. PCT/US2024/016553, pp. 1-17, dated Jul. 12, 2024.

*Primary Examiner* — Gerald Johnson
(74) *Attorney, Agent, or Firm* — James Scott Nolan (57) ABSTRACT

Near Infrared Spectroscopy is employed to non-invasively detect blood glucose concentrations, in a multi-sensing detection device. A multi-layered artificial neural network is used to assess these relationships of non-linear interference from human tissue, as well as differences among individuals, and accurately estimate blood glucose levels. Diffuse reflectance spectrum from the palm at six different wavelengths analyzed with a neural network, results in a correlation coefficient as high as 0.9216 when compared to a standard electrochemical glucose analysis test.

22 Claims, 5 Drawing Sheets

(56) References Cited

U.S. PATENT DOCUMENTS

| | | | |
|---|---|---|---|
| 10,512,407 | B2 | 12/2019 | Richards et al. |
| 10,700,774 | B2 | 6/2020 | Panther et al. |
| 10,878,959 | B1* | 12/2020 | Reykhert ............... G16H 50/30 |
| 10,880,724 | B2 | 12/2020 | Song et al. |
| 10,998,101 | B1 | 5/2021 | Tran et al. |
| 11,029,199 | B2 | 6/2021 | Turgeon et al. |
| 11,096,601 | B2 | 8/2021 | Hong et al. |
| 11,116,448 | B1 | 9/2021 | Trapero Martin et al. |
| 11,141,129 | B1 | 10/2021 | Trapero Martin et al. |
| 11,166,635 | B2 | 11/2021 | Trapero Martin et al. |
| 11,207,025 | B1 | 12/2021 | Trapero Martin et al. |
| 11,357,426 | B2 | 6/2022 | Tran |
| 11,694,533 | B2 | 7/2023 | Shelton, IV et al. |
| 11,754,542 | B2 | 9/2023 | Connor |
| 11,766,216 | B2 | 9/2023 | Zilkie et al. |
| 11,786,251 | B2 | 10/2023 | Shelton, IV et al. |
| 11,806,109 | B2 | 11/2023 | Yuen et al. |
| 2015/0119725 | A1 | 4/2015 | Martin et al. |
| 2015/0320588 | A1 | 11/2015 | Connor |
| 2016/0073886 | A1 | 3/2016 | Connor |
| 2016/0081552 | A1* | 3/2016 | Wojtczuk ............... A61B 5/0059 600/473 |
| 2016/0113526 | A1 | 4/2016 | Nageshwar et al. |
| 2016/0232811 | A9 | 8/2016 | Connor |
| 2016/0287110 | A1 | 10/2016 | Morris et al. |
| 2016/0378069 | A1* | 12/2016 | Rothkopf ............... G06F 3/016 368/10 |
| 2017/0119287 | A1 | 5/2017 | Flitsch et al. |
| 2017/0156676 | A1 | 6/2017 | Ferber et al. |
| 2017/0164878 | A1 | 6/2017 | Connor |
| 2017/0188864 | A1 | 7/2017 | Drury |
| 2017/0215793 | A1 | 8/2017 | Newberry |
| 2018/0146870 | A1* | 5/2018 | Shemesh ............ A61B 5/02416 |
| 2018/0242860 | A1 | 8/2018 | LeBoeuf et al. |
| 2018/0353137 | A1 | 12/2018 | Balajadia et al. |
| 2019/0030230 | A1 | 1/2019 | Connor |
| 2019/0110751 | A1 | 4/2019 | Lee et al. |
| 2019/0246963 | A1 | 8/2019 | Chung et al. |
| 2019/0283247 | A1 | 9/2019 | Chang et al. |
| 2019/0385708 | A1 | 12/2019 | Hong et al. |
| 2020/0075812 | A1 | 3/2020 | Konstantatos et al. |
| 2020/0376198 | A1* | 12/2020 | Newberry ............ A61M 5/1723 |
| 2021/0145334 | A1* | 5/2021 | Ferber ................. A61B 5/0205 |
| 2021/0169345 | A1 | 6/2021 | Wasson et al. |
| 2021/0169417 | A1 | 6/2021 | Burton |
| 2021/0212606 | A1 | 7/2021 | Tran |
| 2021/0293616 | A1 | 9/2021 | Capella et al. |
| 2021/0321942 | A1 | 10/2021 | Pushpala et al. |
| 2021/0330207 | A1* | 10/2021 | Richards .............. A61B 5/0059 |
| 2021/0379388 | A1 | 12/2021 | Connor |
| 2022/0028553 | A1 | 1/2022 | Matichuk et al. |
| 2022/0233102 | A1 | 7/2022 | Shelton, IV et al. |
| 2022/0233119 | A1 | 7/2022 | Shelton, IV et al. |
| 2022/0233135 | A1 | 7/2022 | Shelton, IV et al. |
| 2022/0233136 | A1 | 7/2022 | Shelton, IV et al. |
| 2022/0233151 | A1 | 7/2022 | Shelton, IV et al. |
| 2022/0233191 | A1 | 7/2022 | Shelton, IV et al. |
| 2022/0233214 | A1 | 7/2022 | Shelton, IV et al. |
| 2022/0233241 | A1 | 7/2022 | Shelton, IV et al. |
| 2022/0233252 | A1 | 7/2022 | Shelton, IV et al. |
| 2022/0233253 | A1 | 7/2022 | Shelton, VI et al. |
| 2022/0233254 | A1 | 7/2022 | Shelton, IV et al. |
| 2022/0233267 | A1 | 7/2022 | Shelton, IV et al. |
| 2022/0238197 | A1 | 7/2022 | Shelton, IV et al. |
| 2022/0238216 | A1 | 7/2022 | Shelton, IV et al. |
| 2022/0238235 | A1 | 7/2022 | Shelton, IV et al. |
| 2022/0240869 | A1 | 8/2022 | Shelton, IV et al. |
| 2022/0241028 | A1 | 8/2022 | Shelton, IV et al. |
| 2022/0241474 | A1 | 8/2022 | Shelton, IV et al. |
| 2022/0415476 | A1 | 12/2022 | Connor |
| 2023/0103445 | A1 | 4/2023 | Lee et al. |
| 2023/0284905 | A1 | 9/2023 | Matichuk et al. |
| 2023/0355145 | A1 | 11/2023 | Matichuk et al. |
| 2023/0400327 | A1 | 12/2023 | Streem et al. |
| 2025/0049324 | A1 | 2/2025 | Matichuk et al. |
| 2025/0082234 | A1 | 3/2025 | Matichuk et al. |

FOREIGN PATENT DOCUMENTS

| | | |
|---|---|---|
| CN | 108451513 A | 8/2018 |
| CN | 110167430 A | 8/2019 |
| EP | 3387989 A1 | 10/2018 |
| EP | 4486206 A2 | 1/2025 |
| IN | 201941006594 A | 11/2020 |
| KR | 102062646 B1 | 1/2020 |
| KR | 20220112327 A | 8/2022 |
| WO | 2020160058 A1 | 8/2020 |
| WO | 2022231132 A1 | 11/2022 |
| WO | 2023014653 A1 | 2/2023 |
| WO | 2023187686 A1 | 10/2023 |
| WO | 2023220082 A1 | 11/2023 |
| WO | 2024173947 A1 | 8/2024 |

* cited by examiner

BLOOD GLUCOSE ESTIMATION USING NEAR INFRARED LIGHT EMITTING DIODES

CROSS-REFERENCE TO RELATED APPLICATIONS

The current application claims the benefit of U.S. Provisional Application 63/316,901, filed Mar. 4, 2022, which is incorporated by reference.

BACKGROUND

Chronic health issues and disease are on the rise worldwide. Current estimates are that close to 9% of the world population is affected by diabetes, which is expected to rise to 10% by 2045. In addition to full diabetes, an estimated 352.1 million people worldwide are in preliminary stages of diabetes, a figure which is expected to rise significantly in the coming years. Conditions like diabetes can be a contributor to many other diseases/conditions such as cardiovascular disease, nerve damage (neuropathy), problems with nausea, vomiting, diarrhea, constipation, erectile dysfunction, kidney damage (nephropathy), eye damage (retinopathy), potentially leading to blindness, cataracts, glaucoma, foot damage leading to toe, foot or leg amputation, skin conditions including bacterial and fungal infections, hearing impairment, Alzheimer's disease, and depression.

In the case of diabetes, high Blood Glucose (BG) levels (e.g., hyperglycemia) are toxic and cause serious health complications due to damage to the vessels that supply blood to vital organs. Hyperglycemia increases the risk of heart disease and stroke, kidney disease, vision problems, and nerve problems. Frequent self-monitoring of blood glucose levels is an important activity in treating diabetes allowing a person to modify their diet and exercise regimen to ensure that normal BG levels are maintained. Two conventional methods for monitoring include lancing the skin to obtain blood, or employing subcutaneous needle patches that can continuously read glucose levels. The lancet method is painful and expensive requiring a blood sample on an electrochemical test strip. The subcutaneous method is painless but expensive and inconvenient requiring a patch with a subcutaneous needle or other type of inserted component.

Blood glucose monitoring is only effective if it is done regularly. Regular blood glucose monitoring is an essential task in managing diabetes. Users are more likely to manage their condition if their blood glucose measurements are shared with health professionals, and accordingly, monitoring is key. For example, Type 2 diabetes can be treated with diet, exercise, rest, and healthy eating that avoids high glycemic foods.

Unfortunately, monitoring with conventional electrochemical-based test strips is expensive, today typically costing $1.00 for each test and requiring the user to lance their finger to obtain a drop of blood for the test. Newly emerging continuous glucose monitors (CGMs) employ a patch containing electronics and a small-short needle that penetrates the surface of the skin. However, these conventional CGMs are still invasive by penetrating the skin, and need to be replaced very so often that they wind up being very expensive, typically costing $10/day or more.

Non-invasive analysis of various physical signals representative of health, like blood glucose levels, has been extensively studied, however what is needed is a wearable device and associated system for non-invasive analysis of health or physical variables such as blood glucose levels of the wearer.

SUMMARY

This document describes a multi-sensing system and method to test, read, or monitor one or more physical attributes or conditions of a wearer of a wearable device, such as blood glucose, using light, to overcome problems in other prior art solutions to non-invasive blood glucose monitoring and management. In some aspects, a device can employ near infrared diffuse reflectance spectrum analysis combined with a multi-layer artificial neural network to directly read glucose levels from the skin. This technique is non-invasive, inexpensive, and convenient. A wearable version of the device can continuously monitor BG levels without penetrating the skin.

A wearable system is described herein, which is configured for monitoring health of a wearer, and in particular the blood glucose levels of the wearer. The wearable system can also include technology to track various biometrics such as heart rate, heart rate variability, blood pressure, oxygen saturation, respiration rate, sleep levels, activity levels. The wearable system can include a device that can be worn on the wearer's wrist, carried on a wearer's person, worn on a chain or strap, or attached to some part of the wearer's body.

Information collected from the wearable system can be provided to the individual, stored on a server, and or shared with other health professionals. Along with such information, users can track other health journal information relating to food consumption, activities or other observances relating to a person's health. The information supplied by the wearable system, in combination with user-supplied information, can provide a more complete understanding of a person's health state, and which can be analyzed by the wearer or health professional to make health condition assessments and predictions.

A health wearable that tracks glucose, activity levels, sleep and related metrics can be used to store data in on a server. The server-based solution can be used to help provide health advice and can be used to share health information with a health professional.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document describes a system and method, employing a novel wearable device, to non-invasively test and monitor one or more physical attributes or conditions of a wearer of the wearable device. In some implementations, the wearable device can test for blood glucose (BG) levels using illumination by light of specific frequencies and scan durations. The system and method using light to test BG levels is painless, safe and inexpensive, and non-invasive, and overcomes the aforementioned problems with other conventional solutions to detecting, monitoring and management of any of a number of health conditions.

Other techniques that can be employed by a wearable device consistent with the present disclosure include, without limitation: polarimetry, photoacoustic spectroscopy, bioelectrical impedance spectroscopy, thermal emission, optics and other technologies. Optical techniques are recognized as highly accurate, painless and safe noninvasive glucose measurement techniques. Some methods can include optical coherence tomography, microwave spectroscopy, near-infrared spectroscopy (NIRS), midinfrared spectroscopy (MIRS), Raman spectroscopy and visible laser light. NIRS has the advantage of simplicity and effectiveness relative to other techniques. NIRS components are reasonably priced and can penetrate the skin to adequate depths to enable accurate analysis.

In some implementations, a wearable device employs near infrared diffuse reflectance spectrum analysis combined with a multi-layer artificial neural network to directly read glucose levels from, or within, the wearer's skin. This technique is non-invasive, inexpensive, and convenient. A wearable version of the device can continuously monitor BG levels without penetrating the skin.

Electromagnetic waves have characteristic absorption levels for every element. This phenomenon is the basis for spectral analysis used in many industries. Exposing a sample to specific wavelengths and detecting the absorption levels allows one to determine the presence of specific elements. Combinations of elements produce absorption patterns that can be used to determine the presence of molecules based on their elemental composition. By comparing light intensity with absorption response, it is possible to determine levels of concentration of any target analyte.

In other words, a system, method and device as described herein does not use light wavelength characteristics directly, but rather rely on a change in light reflectance of the skin (or within subcutaneous layers) in response to the presence of some compound, chemical, component or other analyte, such as glucose for example. In preferred implementations, the systems, methods and devices described herein do not directly detect concentration levels of any specific analyte, such as using Beer-Lambert law, but rather using machine-learning (ML) techniques and artificial intelligence (AI) to discover non-linear relationship functions between analytes and LED reflectance. Further, these analyses can be tailored for each individual, who has a unique non-linear relationship function based on their genetic makeup, environmental factors, lifestyle, and behaviors, to name a few.

Figure 1:
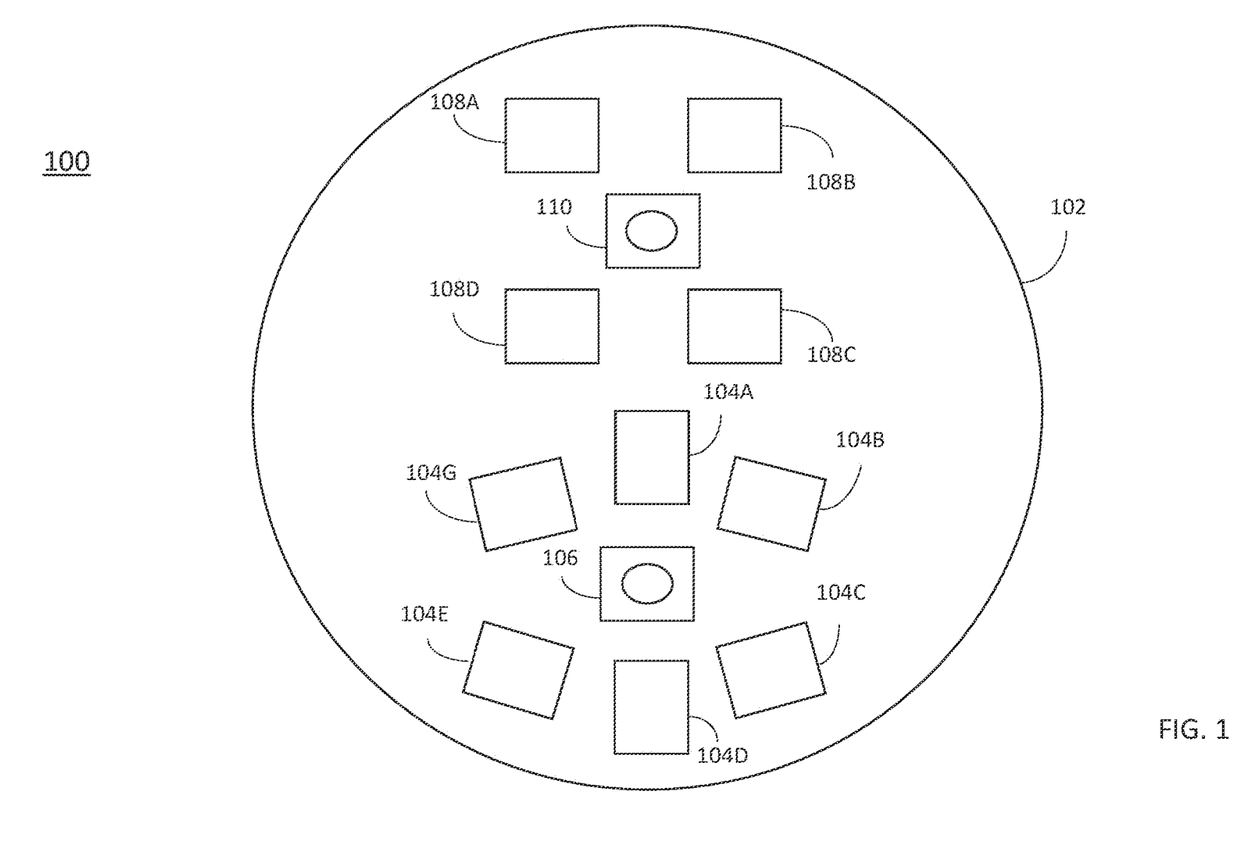
FIG. 1 illustrates a device and sensor assembly for testing and monitoring one or more physical attributes or conditions of a wearer of the device.

FIG. 1 illustrates a device 100 for testing and monitoring one or more physical attributes or conditions of a wearer of the device 100. The device 100 can be incorporated into a wearable device, such as a watch, a patch, or the like. The device 100 includes a sensing array 102. The sensing array can be encapsulated, housed or covered by a cover formed of a transparent material, such as glass. The cover is preferably planar or can be shaped to accommodate a specific body part of a wearer where the device 100 will be attached to the wearer.

The device 100 includes a number of first light sources 104 and second light sources 108, such as LEDs, that are configured to produce light at certain wavelengths, and a number of light sensors 106 and 110, such as photodiodes, that are configured to absorb light returned from a target area of the light sources and convert the returned light into an electrical current. The first light sources 104 (104A-104G) can be configured to cooperate with first light sensor 106, where the first light sources 104A-104G are configured to emit light at a particular wavelength, and the first light sensor 106 is positioned, tuned and configured to receive a first set of returned light signals. Likewise, the second light sources 108 (108A-108D) are configured to emit light at other particular wavelengths, and the second light sensor 110 is positioned, tuned and configured to receive a second set of returned light signals. As such, the device 100 can be programmed for illuminating a wearer with many different wavelengths or wavelength ranges, as well as be configured, via the first and second light sensors 106, 110 to receive specific light signatures. The device 100 can include more light sources or groups of light sources, as well as additional light sensors.

In some implementations, the LED array of two or more LEDs, each configured to illuminate at predetermined but different wavelengths, is configured to emit light in a pulse in a cycle through each of the two or more LEDs. For example, with reference to FIG. 1, the LED array is configured to emit a first light from LED 104A at a first wavelength, a second light from LED 104B at a second wavelength, a third light from LED 104C at a third wavelength, a fourth light from LED 104D at a fourth wavelength, a fifth light from LED 104D at a fifth wavelength, and a sixth light from LED 104E at a sixth wavelength. The first light sensor 106 is configured to receive at least a portion of the first light reflected from a skin of the user, at least a portion of the second light reflected from a skin of the user, at least a portion of the third light reflected from a skin of the user, at least a portion of the fourth light reflected from a skin of the user, and at least a portion of the fifth light reflected from a skin of the user, and at least a portion of the sixth light reflected from a skin of the user.

In some implementations, the first wavelength is about 1050 nm, the second wavelength is about 1200 nm, the third wavelength is about 1300 nm, the fourth wavelength is about 1450 nm, the fifth wavelength is about 1550 nm, and the sixth wavelength is about 1650 nm. In some embodiments any one LED may vary by +/−50 nm. The device can be configured to sweep 20 steps from 0 amps to 5ma, at wavelengths of 1050 nm, 1200 nm, 1300 nm, 1450 nm, 1550 nm, and 1650 nm. Note that these are approximate frequencies and various devices will have slightly different ranges. The minimum and maximum may vary and may be tuned to an individual in order to obtain best results. The number of steps in each sweep may also vary. Further, other wavelengths can be used, such as approximately 450 nm, approximately 650 nm, approximately 750 nm, and approximately 950 nm. By pulsing and cycling through each of the LEDs 104, the first light sensor 106 is able to receive multiple different reflections of light, to detect a variety of different bodily concentrations of certain analytes of the wearer.

Figure 2:
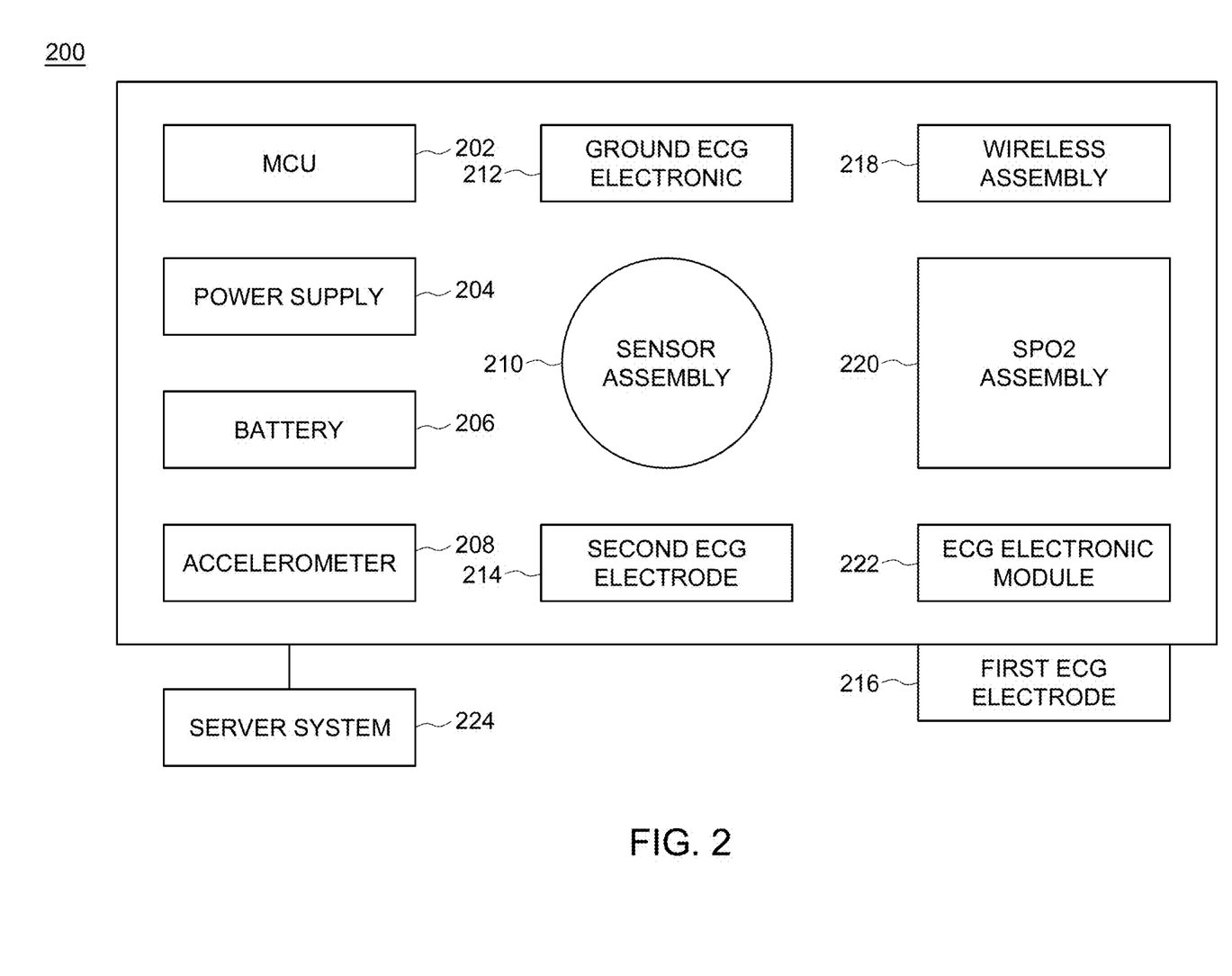
FIG. 2 illustrates an electronic assembly for powering and controlling the device and sensor assembly.

FIG. 2 illustrates an electronic assembly 200 for powering and controlling a device and sensor assembly 210 as described in FIG. 1. The electronic assembly 200 includes a microcontroller unit (MCU) 202, having one or more central processing units, for controlling the operations of the device. The MCU 202 can also include memory, such as working memory as well as long-term memory, as well as any number of input/output connections for communicating with peripheral devices via wired or wireless connections. The MCU 202 manages all of the operations of the device.

The electronic assembly 200 further includes a power supply 204 for powering the MCU 202 and the sensor assembly 210, as well as all other electrical components of the electronic assembly 200. The electronic assembly 200 can include a battery 206 for local electrical storage. In some implementations, the electronic assembly 200 battery 206 can be charged by electrical connection, by induction, or the like.

The electronic assembly 200 can further include an accelerometer 208 for measuring an acceleration of the electronic assembly 200, an SpO2 assembly 220 for measuring the wearer's oxygen levels, and a wireless assembly 218 for communicating wirelessly with a peripheral device. The wireless assembly 218 can be a Bluetooth transceiver, a WiFi transceiver, or a cellular transceiver, and can be used to communicate signals between the electronic assembly 200, and any component thereon, and a peripheral device. The electronic assembly can further include an electrocardiogram (ECG) electronics module 222 for measuring the wearer's heart rhythm and heart electrical activity. The ECG electronics module 222 can include a first ECG electrode 216, a second ECG electrode 214, and a ground ECG electrode 212.

Figure 3:
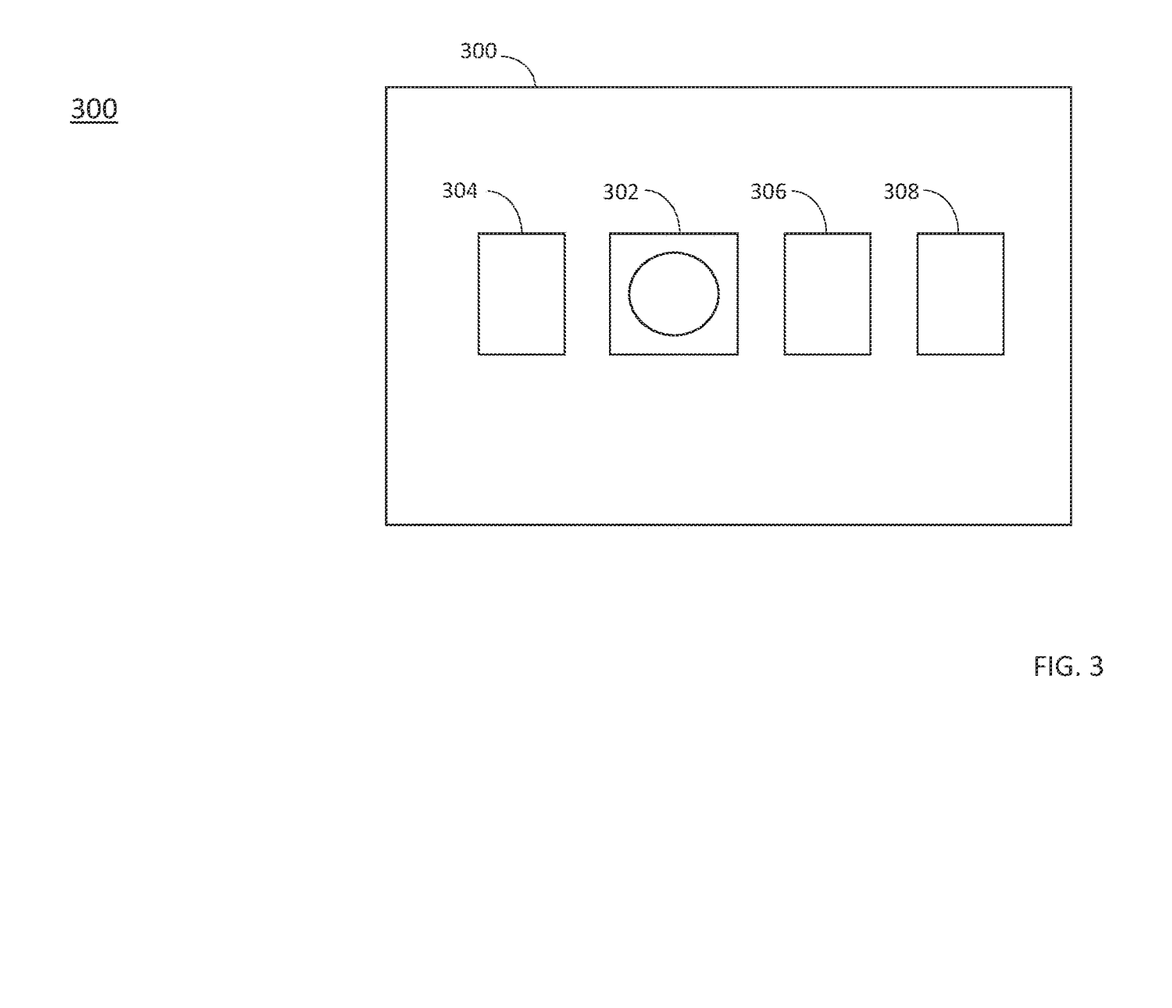
FIG. 3 illustrates an SPO2 and PPG assembly for a blood glucose estimation system using near infrared light emitting diodes amidst other light emitting diodes for other sensing applications.

As described above with respect to FIG. 1, the sensor assembly 210 can include a number of light sources that are configured to produce light at certain wavelengths, and a number of light sensors that are configured to absorb light returned from a target area of the light sources and convert the returned light into an electrical current. As shown in FIG. 3, a sensor assembly 300 can include a light sensor 302 configured to receive reflected light emissions from a green LED 304, a red LED 306, and an infrared LED 308. Other combinations and wavelengths of LEDs can be employed within the teachings herein.

In some implementations, a health monitoring system includes a wearable electronic apparatus. In some preferred implementations, the wearable electronic apparatus is configured to be worn on a body part, such as around an individual's wrist, in order to monitor and assess the individual's blood glucose level and can include other health data.

Figure 4:
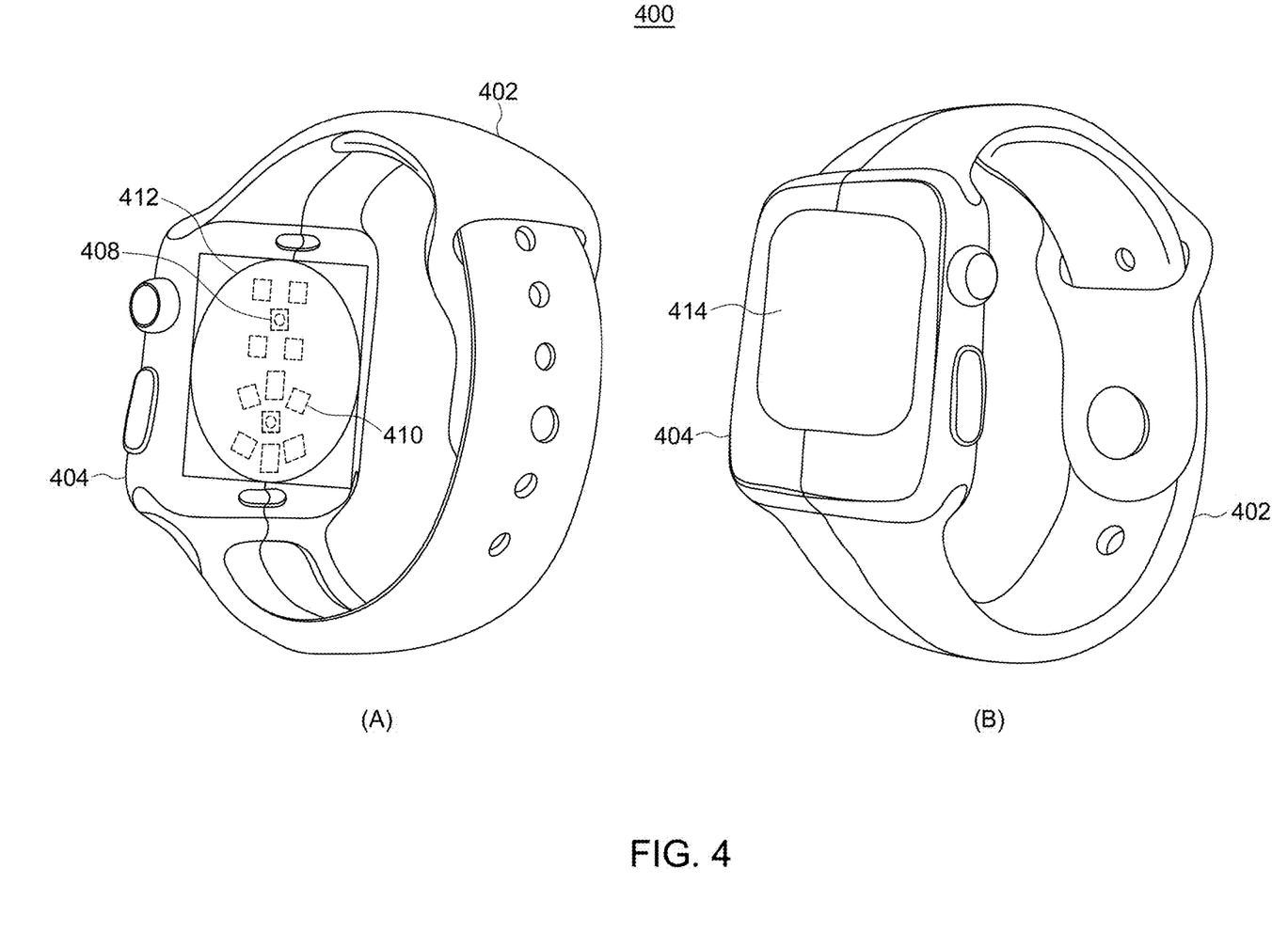
FIG. 4 illustrates a wearable device having a sensor assembly, electronic assembly, digital display and one or more straps for attaching the wearable device to a user for sensing the user's blood glucose levels using light emitting diodes.

In some preferred exemplary implementations, as illustrated in FIG. 4, a wearable device 400 of a health monitoring system includes an attachment structure 402 having an electronics module 404. The electronics module 404 includes a sensing array 406 that includes a light-emitting and light-sensing array of diodes and other electronic components. As discussed above with respect to FIG. 1, and as shown in FIG. 4A, the array 404 can include a number of light sources 408, such as LEDs, that are configured to produce light at certain wavelengths, and a number of light sensors 410, such as photodiodes, that are configured to absorb light returned from a target area of the light sources and convert the returned light into an electrical current. The electrical current can then be used as an input to a machine learning module to extrapolate or derive information about the target area and its target analyte.

The sensing array 406 can be placed on an underside of the electronics module 404 and have a transparent cover 412 that is formed of a transparent material such as glass. The attachment structure 402 and a shape of the electronics module 404 can be configured to position the transparent cover 412, and the underlying sensing array 406, over the skin associated with the target area of the body of an individual. As shown in FIG. 4B, the electronics module 404 includes an output module 414 in communication with a processor module for graphically representing any of the readings, ratings, and/or outputs to the individual. The electronics module 404 can further include at least one circuit board, a battery and a battery charging circuit, for charging the sensing array 406 and the output module 414.

In some implementations, the attachment structure 402 is a band. The band can be configured to position the wearable electronic apparatus on a wrist, ankle, arm or leg of the user, or specifically, to position the electronics module in proximity with a blood vessel of the user. The attachment structure 402 can further include a connector for receiving a smartwatch or other computing device. In some implementations, the connection is a pin connection.

The output module 414 can include a display. The display can be a multi-color LED. The display can be configured to notify the user if the one or more sensors are ready to obtain readings, if the wearable device is converting the readings to output data, and if the wearable device has successfully completed collection of data from the sensors. In alternative implementations, the output module 414 can be, or can include, a speaker or other sound-generating device, which can provide audio outputs, feedback and alerts.

The output module 414 can also include a communication component for transmitting at least one of the calculated blood glucose and the other collected data to a device external to the wearable device 400. In some implementations, the communication component is a wireless communication module, such as a Bluetooth module.

Figure 5:
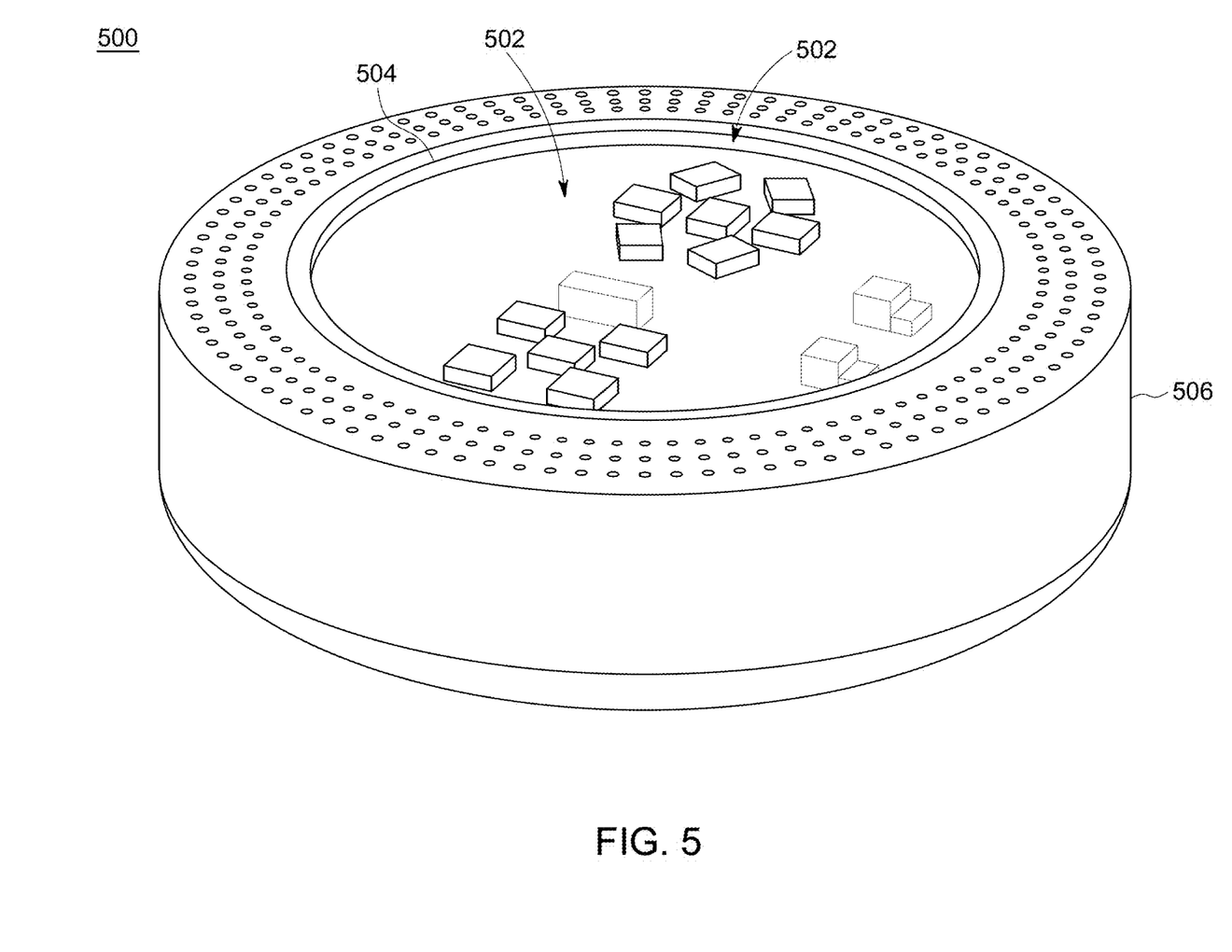
FIG. 5 shows a sensor assembly in a wearable patch.

FIG. 5 illustrates one or more sensing arrays 502 incorporated into a patch device 506, which can be worn at any preferred location on the wearer's body. The patch device 506 can be adhered to a wearer's skin by an adhesive strip or other adhesive device. The patch device 506 can include a housing that houses the one or more sensing arrays 502, which can include a transparent window 504 formed of a transparent material, such as glass or the like. The housing can be solid or can be flexible. The housing can also be configured to house all of the electronic components to power the one or more sensing arrays 502, as well as power internal microprocessors, other sensors, a battery, etc.

In some implementations, the wearable device can further include a collection of NIR LEDs surrounding a photo diode that is optimally sensitive to wavelengths in the range 400 nm to 1650 nm along with a power supply, microprocessor and communications module allowing data to be sent to an external processing device.

Power can be supplied to each LED individually or one-at-a-time. Once powered, the photo-diode data is read from an amplifier circuit and an Analog to Digital (A/D) converter. This data is fed into a deep learning ANN that is has been trained to map the reading to a specific analyte, i.e., glucose, measurement. In some implementations, the wearable device can be retrofit to existing wearable technologies, for example, the device can comprise a wristband peripheral, to be retrofit to a watch, a smartwatch, or other complimentary wrist-worn wearable technology. Further, the device can comprise a patch that is held against a wearer's skin by an adhesive. The patch can have a housing or some other protective cover over the LEDs and photodiode array.

The output of the data readings and analysis can provide a health trajectory for the individual to predict a future state of health, as well as review the historical health trajectory from past states. In some implementations, the output of the data readings and analysis can be subject to an "autotagging" program where the device can determine the individual's behavior (such as eating, sleeping, exercising, or a state of stress) at a time point and attaching an electronic tag to that event. The auto-tagging program can also include a system, including hardware and software, whereby manual data can also augment and increase the individual's ability to capture additional details of personal relevance.

In preferred implementations, the data collected and amalgamated through the device can be subject to "machine learning" systems and methods to provide for predictive analysis for the individual, configured in a format so as to assist the individual in achieving personal health and wellness objectives. The data collected by the apparatus can apply psychometrics data analysis to assist the individual in achieving personal health and wellness objectives.

In preferred implementations, the output/display module is integral with the electronics module. In some alternatives, the output/display module is remote, but in communication with the electronics module. In other alternatives, the output/display module is a multi-color LED for providing individual interaction with device. The multi-color LED can be configured to let the individual know if health wearable data are ready to obtain the readings, if the apparatus is converting the readings to the outputs, and if the apparatus has successfully completed each measurement. The band can further include a connection to receive a smartwatch. In some implementations, the connection is a smartwatch pin connection.

Broadly stated, a method is provided for monitoring and assessing an individual's blood glucose levels. In preferred implementations, the method includes steps of providing a wearable electronic device as described herein (where the wearable electronic device includes one or more sensors or sensing devices and at least one processor); positioning the wearable electronic apparatus on the skin of an individual; taking, via the sensors, simultaneous measurements of heart rate, PWV, reflected light from LEDs within the blood glucose sensitive area; using the at least one processor to convert the heart rate, PWV measurements into a blood glucose estimate; and reflecting any of the readings, ratings, and/or outputs to the individual through the output/display module or transmitted to an external device.

In some implementations, the taking of the simultaneous measurements step is accomplished automatically using a timer. The output of the data readings and analysis can be subject to an auto-tagging and/or tagging program where the apparatus can determine the individual's behavior as an event (such as eating, sleeping, working out, or stress) at a time point and attach an electronic/digital tag to that event. In some instances of the present disclosure, the output of the data readings and further analysis can provide a health trajectory for the individual to predict a future state of health.

According to another aspect, a wearable electronic apparatus for monitoring a user's blood glucose levels is disclosed. The apparatus comprises: an attachment structure for attaching the wearable apparatus to a predefined body location of the user; and an electronics module coupled to the attachment structure. The electronics module comprises: a plurality of sensors comprising at least a collection of LEDs and one or more photo diode; a processor module coupled to the plurality of sensors for collecting data therefrom and for calculating blood glucose using a machine learning method based at least one collected data; and an output module coupled to the processor module outputting at least one of the calculated blood glucose readings and the collected data.

The electronics module can further include an accelerometer for collecting the movement data of the user. The processor module can calculate blood glucose using the machine learning method based on collected data and the user's historical health data.

Machine Learning

In preferred exemplary implementations of the present disclosure, a machine learning method is used. The machine learning method can be one or more of a polynomial regression analysis method, a neural network, a Bayesian network, a decision tree, an adaptive logic network, a support vector machine, or a multilayered convolutional neural network.

According to another aspect of this disclosure, there is provided a method for monitoring a user's blood glucose levels. The method comprises: collecting data of the user using at least one sensor, the data comprising the blood glucose measurement apparatus; calculating blood glucose of the user using a machine learning method based at least one collected data; and outputting at least one of the calculated blood glucose readings and the collected data.

In some implementations, a method of estimating or testing blood glucose levels includes steps of: emitting a first light at a first wavelength, a second light at a second wavelength, a third light at a third wavelength, a fourth light at a fourth wavelength, a fifth light at a fifth wavelength, a sixth light at a sixth wavelength; receiving at least a portion of the first light reflected from a skin of the user, and at least a portion of the second light reflected from a skin of the user, and at least a portion of the third light reflected from a skin of the user, and at least a portion of the fourth light reflected from a skin of the user, and at least a portion of the fifth light reflected from a skin of the user, and at least a portion of the sixth light reflected from a skin of the user; determining a first reading corresponding to the amount of the first light being absorbed by the blood under the skin and a second reading corresponding to the amount of the second light being absorbed by the skin, and a third reading corresponding to the amount of the third light being absorbed by the skin, and a fourth reading corresponding to the amount of the fourth light being absorbed by the skin, and a fifth reading corresponding to the amount of the fifth light being absorbed by the skin, and a sixth reading corresponding to the amount of the sixth light being absorbed by the skin; and calculating the blood glucose of the user using an artificial neural net.

Although a few embodiments have been described in detail above, other modifications are possible. Other embodiments may be within the scope of the following claims.

The invention claimed is:

1. A continuous non-invasive sensor system having a multi-sensing detection device, the sensor system for employing spectral related skin response data for determining a light signature from which a concentration of glucose being present in a tissue of a body of a wearer of the multi-sensing detection device may be determined, the system comprising:
   a multi-sensing detection device being configured for being positioned proximate the skin when the multi-sensing detection device is coupled to the body of the wearer, the multi-sensing detection device having a glucose sensor unit for detecting glucose being present within the wearer's tissue, the multi-sensing detection device comprising:

a housing configured so as to be positionable proximate the skin of the wearer, the housing further being configured for encasing the glucose sensor unit, the housing having a top cover and a bottom cover;

a glucose sensor unit for detecting a skin characteristic response of one or more tissues of the body due to a presence of glucose within the tissue, the glucose sensor unit comprising:

a printed circuit board having a first and a second sensor array coupled therewith, each sensor array including a number of photoemitters and one or more photoreceivers, each sensor array being arranged on the printed circuit board within in the housing so as to be proximate the user's tissue when the multi-sensing detection device is coupled to the user's body, the one or more photoemitters configured to illuminate, in one or more cycles, at a predetermined frequency and duration of light, the tissue of the user's body, and each of the one more photoreceivers configured to receive a return of the light reflected back from the user's tissue and to generate a return signal in response to collecting the reflected light, the first sensor array comprising six photoemitters positioned so as to be proximate at least a first photoreceiver and being configured for directing light so as to penetrate a determined depth within the tissue of the user's body, the six photoemitters including a first photoemitter formed of a first light emitting diode configured for emitting light of a first wavelength, a second photoemitter formed of a second light emitting diode configured for emitting light of a second wavelength, a third photoemitter formed of a third light emitting diode configured for emitting light of a third wavelength, a fourth photoemitter formed of a fourth light emitting diode configured for emitting light of a fourth, a fifth photoemitter formed of a fifth light emitting diode configured for emitting light of a fifth wavelength, and a sixth photoemitter formed of a sixth light emitting diode configured for emitting light of a sixth wavelength, wherein the first photoreceiver is configured for detecting light of the six photoemitters reflected back from the body's tissues, and the second sensor array comprising a number of additional photoemitters positioned so as to be proximate at least a second photoreceiver, wherein the second photoreceiver is configured for detecting light of the number of additional photoemitters reflected back from the body's tissues, collectively the light emitting diodes of the first and second sensory array being configured for directing the emitted light of their respective wavelengths into the tissue of the wearer, and the at least first and second photoreceivers being configured for collecting the light reflected back form the body tissue so as to generate the return signal, the printed circuit board further comprising an analog to digital converter coupled to the at least first and second photoreceivers, the analog to digital converter being configured for converting the return signal to digital signal data, and a communications module for transmitting the digital signal data; and a server system for receiving the digital signal data from the multi-sensing detection device, the server system comprising a first processing module having a first processor for analyzing the digital signal data so as to produce light signature data, and a second processor for analyzing the light signature data so as to thereby determine the concentration of glucose being present in the tissue of the body of the wearer.

2. The continuous non-invasive sensor system in accordance with claim 1, wherein the second array comprises four photoemitters positioned so as to be proximate the second photoreceiver, the four photoemitters including a seventh photoemitter formed of a seventh light emitting diode configured for emitting light of a seventh wavelength, an eighth photoemitter formed of a eighth light emitting diode configured for emitting light of an eighth wavelength, a ninth photoemitter formed of a ninth light emitting diode configured for emitting light of a ninth wavelength, and a tenth photoemitter formed of a tenth light emitting diode configured for emitting light of a tenth wavelength.

3. The continuous non-invasive sensor system in accordance with claim 2, wherein the seventh light emitting diode is configured for emitting light of a wavelength of about 450 nm, the eighth light emitting diode is configured for emitting light of a wavelength of about 650 nm, the ninth light emitting diode is configured for emitting light of a wavelength of about 750 nm, and the tenth light emitting diode is configured for emitting light of a wavelength of about 950 nm, wherein the second photoreceiver is configured for detecting light of the four photoemitters reflected back from the body's tissues.

4. The continuous non-invasive sensor system in accordance with claim 1, wherein the second array comprises three photoemitters positioned so as to be proximate the second photoreceiver, the three photoemitters including a seventh photoemitter formed of a seventh light emitting diode configured for emitting light of a seventh wavelength, an eighth photoemitter formed of a eighth light emitting diode configured for emitting light of an eighth wavelength, and a ninth photoemitter formed of a ninth light emitting diode configured for emitting light of a ninth wavelength.

5. The continuous non-invasive sensor system in accordance with claim 4, wherein the seventh photoemitter is configured for emitting red light, the eighth photoemitter is configured for emitting green light, and the ninth photoemitter is configured for emitting infrared light.

6. The continuous non-invasive sensor system in accordance with claim 5, wherein the second sensor array comprises a PPG sensor assembly.

7. The continuous non-invasive sensor system in accordance with claim 6, wherein the printed circuit board comprises one or more of an accelerometer and an SPO2 assembly.

8. The continuous non-invasive sensor system in accordance with claim 7, wherein the printed circuit board additionally comprises an ECG module and a plurality of ECG electrodes, at least one of the plurality of ECG electrodes being a ground ECG electrode, the ground ECG electrode being positioned on opposite sides of the first and second sensor array.

9. The continuous non-invasive sensor system in accordance with claim 6, wherein the server system comprises an Artificial Intelligence module, and the Artificial Intelligence module is configured for receiving and analyzing the digital signal data so as to produce the light signature results data.

10. The continuous non-invasive sensor system in accordance with claim 9, wherein the Artificial Intelligence module comprises a Machine Learning module and an Artificial Neural Network (ANN).

11. The continuous non-invasive sensor system in accordance with claim 10, wherein the ANN maps the light signature results data to the concentration of glucose.

12. The continuous non-invasive sensor system in accordance with claim 11, wherein the mapping comprises comparing an intensity of a number of reflected light wavelengths to the absorption response of the skin so as to determine the light signature, whereby a level of concentration of glucose can be determined by the light signature based on a change in a pattern of the skin's absorption response caused by the presence of glucose within the skin.

13. The continuous non-invasive sensor system in accordance with claim 12, wherein the determining of the absorption response is based on a non-linear relationship between changes of reflectance due to a range of different wavelengths.

14. The continuous non-invasive sensor system in accordance with claim 13, wherein the ANN is further configured for determining a health trajectory of the wearer, from which health trajectory a future health state of the wearer is predicted.

15. A continuous non-invasive sensor system having a multi-sensing detection device, the sensor system for employing diffuse reflectance spectrum analysis for determining a skin response from which a concentration of an analyte being present in a skin tissue of a body of a wearer of the multi-sensing detection device may be determined, the system comprising:
  an attachment structure having an inner portion and an outer portion, the inner portion for engaging with the multi-sensing detection device, and the outer portion including a surface having an adhesive so as to hold the attachment structure against the wearer's skin; and
  a multi-sensing detection device retained within the inner portion of the attachment structure and being configured for being positioned proximate the skin of the wearer when the attachment structure is adhered to the body of the wearer, the multi-sensing detection device having an analyte sensor unit for detecting a specific analyte being present within the wearer's tissue, the multi-sensing detection device comprising:
    a housing configured for engaging with the attachment structure in a manner so as to be held against the body of the wearer, the housing further being configured for encasing the analyte sensor unit, the housing having a top cover and a bottom cover, the bottom cover including a transparent portion therein;
    an analyte sensor unit for detecting a characteristic skin response of one or more tissues of the body due to a presence of the analyte within the tissue, the analyte sensor unit comprising:
      a printed circuit board having a first and a second sensor array coupled therewith, each sensor array including a number of photoemitters and one or more photoreceivers, each sensor array being arranged on the printed circuit board within the housing proximate the transparent portion opposite the user's tissue, the one or more photoemitters configured to illuminate, in a plurality of cycles, at a predetermined frequency and duration of light, the user's tissue, and each of the one more photoreceivers configured to receive a return of the light reflected back from the user's tissue and to generate a return signal in response to collecting the reflected light,
      the first sensor array comprising six photoemitters positioned proximate at least a first photoreceiver, the six photoemitters including a first photoemitter formed of a first light emitting diode configured for emitting light of a wavelength of about 1050 nm, a second photoemitter formed of a second light emitting diode configured for emitting light of a wavelength of about 1200 nm, a third photoemitter formed of a third light emitting diode configured for emitting light of a wavelength of about 1300 nm, a fourth photoemitter formed of a fourth light emitting diode configured for emitting light of a wavelength of about 1450 nm, a fifth photoemitter formed of a fifth light emitting diode configured for emitting light of a wavelength of about 1550 nm, and a sixth photoemitter formed of a sixth light emitting diode configured for emitting light of a wavelength of about 1650 nm, wherein the first photoreceiver is configured for detecting light of the six photoemitters reflected back from the body's tissues, and
      the second array comprising three photoemitters positioned so as to be proximate a second photoreceiver, the three photoemitters including a seventh photoemitter formed of a seventh light emitting diode configured for emitting light of a seventh wavelength, an eighth photoemitter formed of a eighth light emitting diode configured for emitting light of an eighth wavelength, and a ninth photoemitter formed of a ninth light emitting diode configured for emitting light of a ninth wavelength,
        wherein the second photoreceiver is configured for detecting light of the three photoemitters reflected back from the body's tissues, and further wherein, collectively, the light emitting diodes of the first and second sensory arrays are configured for directing the emitted light of their respective wavelengths into the tissue of the wearer, and the plurality of photoreceivers are configured for collecting the light reflected back form the body tissue so as to generate the return signal;
    the printed circuit board further comprising an analog to digital converter coupled to the at least first and second photoreceivers, the analog to digital converter being configured for converting the return signal to digital signal data, and a communications module for transmitting the digital signal data; and
  a control unit coupled to the printed circuit board, the control unit configured to generate activation of each of the photoemitters, whereby each photoemitter of the first and second sensor arrays may be activated individually or collectively in one or more of a predetermined wavelength, a predetermined frequency, a predetermined intensity, and a predetermined duration.

16. The continuous non-invasive sensor system in accordance with claim 15, further comprising a server system for receiving the digital signal data from the multi-sensing detection device, the server system comprising a first processing module having a first processor for analyzing the digital signal data so as to produce spectral array data, and a second processor for analyzing the spectral array data so as to thereby determine a light signature of the skin in response to receipt of the spectral array of light waves from which light signature the concentration of the analyte being present in the skin tissue of the body of the wearer.

17. The continuous non-invasive sensor system in accordance with claim 16, wherein the activation of the photoemitters in accordance with the predetermined wavelength, frequency, intensity, and/or duration results in a pattern of absorption, and the second processor employs the pattern of absorption in determining the light signature from which the concentration of the analyte being present in the tissue of the body of the wearer.

18. The continuous non-invasive sensor system in accordance with claim 17, wherein the seventh light emitting diode is configured for emitting red light, the eighth light emitting diode is configured for emitting green light, and the ninth light emitting diode is configured for emitting infrared light.

19. The continuous non-invasive sensor system in accordance with claim 18, wherein the second sensor array comprises a PPG sensor assembly.

20. The continuous non-invasive sensor system in accordance with claim 19, wherein the server system further comprises an Artificial Intelligence module, and the Artificial Intelligence module is configured for receiving and analyzing the digital signal data so as to produce the light signature results data.

21. The continuous non-invasive sensor system in accordance with claim 20, wherein the Artificial Intelligence module comprises a Machine Learning module and an Artificial Neural Network (ANN), and further wherein the ANN maps the light signature results data to the concentration of the analyte.

22. The continuous non-invasive sensor system in accordance with claim 21, wherein the mapping comprises comparing an intensity of a number of reflected light wavelengths to the pattern of absorption of the skin so as to determine the light signature, whereby a level of concentration of glucose can be determined by the light signature based on a change in the skin's absorbance response caused by the presence of glucose within the skin.

* * * * *